July 24, 1973  R. G. WHEELER  3,748,222
PROCESS FOR MAKING A FIBER OVERLAY WEB FOR A COMPOSITE BOARD
Filed Oct. 20, 1971

INVENTOR
ROBERT G. WHEELER
BY  E. A. BUCKHORN
ATTORNEY

United States Patent Office 3,748,222
Patented July 24, 1973

3,748,222
PROCESS FOR MAKING A FIBER OVERLAY WEB
FOR A COMPOSITE BOARD
Robert G. Wheeler, Corvallis, Oreg., assignor to Wood
Processes, Oregon Ltd., Corvallis, Oreg.
Filed Oct. 20, 1971, Ser. No. 190,764
Int. Cl. D21f 3/04
U.S. Cl. 162—165　　　　　　　　　　　　　4 Claims

ABSTRACT OF THE DISCLOSURE

A process for making a moist web for use in forming an overlay for a composite assembly of board or panel components to be cured in a hot press, the web being formed from a slurry of cellulosic fiber pulp to which has been added a proportionate amount of a pale, thermoplastic, neutral hydrocarbon resin in water suspension. After thoroughly mixing these together, additional quantities of paraffine wax emulsion size and of phenol-formaldehyde resin are added. After this has been thoroughly mixed the pH is adjusted by the addition of a quantity of alum to a value of from 4.5 to 5. An aqueous pigmented color coating mixture is then preferably applied to the outer surface of the wet web consisting of water, a basic polymer emulsion such as vinyl acrylic latex, vinyl acetate homopolymer or acrylate ester copolymer and pigment. The resultant skins of the panel emerging from the hot press separate freely from the platens or caul plates with no residue buildup even though the latter may have rough or uneven pattern embossing surfaces.

BACKGROUND OF THE INVENTION

The present invention relates to a process for forming cellulosic fiber overlay material for panels of various kinds and, more specifically, composite board products provided with tough surface skins of consolidated cellulosic fibers.

While the overlay material is not necessarily limited thereto, it is particularly suitable for use in connection with the manufacture of particle boards of the type disclosed in the prior U.S. Pats. 2,992,152 and 3,011,938, both issued to Ralph Chapman.

In the manufacture of composite board products including an overlay on one or both sides, it is sometimes desirable to incorporate resin in the overlay material. During the compression and heating of the composite sandwich of assembled materials between platens of the hot press a certain amount of resin buildup occurs on the surface of the platens or caul plates which buildup must be periodically removed. This is not particularly difficult to accomplish if the surfaces of the platens or caul plates next adjacent the boards being formed are flat and smooth. However, if the surfaces of either the platens or the caul plates next adjacent the boards are uneven, such as for embossing a pattern on the surface of the board including differentially compressed areas, the problem of removing resin buildup on the platen or caul plate surface becomes increasingly difficult.

In my copending patent application Ser. No. 12,356, filed Feb. 18, 1970, entitled Composite Board Product and Method and Apparatus for Forming the Same, is disclosed a composite board product having differentially compressed surface areas so that an assembly of such board products or panels resembles shiplap siding. To produce the desired pattern on the panel surfaces requires the usage of caul plates having raised and indented surface portions complementary to the indented and raised surface portions of the panel. It is quite essential in the manufacture of such panels, particularly for exterior usage, to use a resin in the overlay material, and more especially a resin or any other component which will permit ready separation between the caul plate and the finished panel and which will not result in any buildup of residue on the surface of the caul plate.

SUMMARY OF THE INVENTION

In accordance with the process of my present invention, I first prepare a slurry of cellulosic fiber pulp in water and then add thereto a quantity of a pale, thermoplastic, neutral, hydrocarbon resin and then thoroughly mix the same. There is then added a small quantity of paraffin wax emulsion size and then a further quantity of a suitable phenolic resin. After further mixing the pH of the batch is adjusted by adding a small amount of alum to precipitate the wax and resin onto the pulp fibers. The web is then formed from the slurry by well known means. If a color is desired a mixture is prepared of water, a basic polymer emulsion and a small quantity of pigment of the desired color and a coating of such mixture is applied to the outer surface of the web while it is still wet. The moisture content of the web is then reduced by passing the same over drying rolls to the desired moisture content for use in forming the assembly sandwich just prior to insertion of the same into the hot press. The resultant skins produced on the surface of the finished panel, with or without the color coating, will readily separate from the caul plates even though the latter may have very rough or uneven surfaces and practically no residue buildup occurs on such caul plate surfaces.

It is therefore a primary object of the present invention to provide a new process for making a moist web of cellulosic fiber material which may be used in forming an overlay for a composite board panel, the resultant skins being tough, abrasion and weather resistant, and also readily separable from the caul plates even though the latter may have rough and uneven pattern producing surfaces.

A more specific object is to provide a process for making a moist web of cellulosic fiber material from a slurry to which has been added a pale, thermoplastic, neutral, hydrocarbon resin so that during the formation of skins from moist overlay webs will not result in any resin build-up on the surface of the caul plate even though the latter may have a rough and uneven pattern embossing surface.

A further specific object is to provide a process for making an aqueous color coating mixture which may be applied to one surface of the wet web of cellulosic fiber material before an overlay of such web is assembled into a composite sandwich preparatory to the introduction thereof into a hot press whereby a baked, weather resistant color finish is produced on the outer surface of the resultant panel.

And a still further object is to provide a new process for making a moist web of cellulosic fiber material from a slurry containing a quantity of pale, thermoplastic resin as well as a quantity of phenol-formaldehyde resin so that when an aqueous pigmented color coating is applied to the wet web little or no discoloration of the color coating occurs during the hot pressing operation due to bleeding of the resins through the color coating.

DRAWINGS

DETAILED DESCRIPTION

Figure 1:
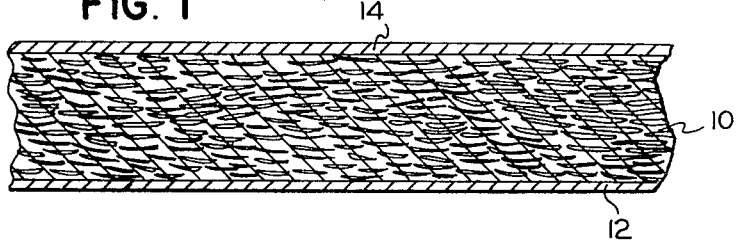
FIG. 1 is a cross-sectional view, partially broken away, of an assembly or sandwich of coarse wooden components between cellulosic fiber webs prepared in accordance with the present invention.

Referring first to FIG. 1 there is shown a portion of a composite board product including a core 10 having surface skins 12 and 14 on the opposite sides thereof. Two well known processes for forming such board products and press apparatus for compressing and heat curing the assembly or sandwich of the components of such board products are disclosed in the above mentioned Chapman Pats. Nos. 2,992,152 and 3,011,938. The present invention is concerned only with a process for making the webs utilized in producing the surface skins 12 and 14, as distinguished from the process for forming comparable webs as disclosed in the above mentioned patents.

For forming composite board products of the type shown in my co-pending application, Ser. No. 12,356 having deeply indented surface portions, I prefer to form the core 10 of wood particles, such as wood shavings, because such shavings lend themselves readily to the production of board products having deep indentations. For the formation of other board products the core 10 may consist of any other suitable material.

The raw material used for forming the webs 12 and 14 is preferably cellulosic fibers and in the above mentioned patents are disclosed various different sources for such fibers. Waste newsprint, which is readily available at low cost in large quantities, has been found entirely suitable for use in connection with the present process.

A paper breaker is first charged with a thousand pounds of dry waste newsprint and enough water to bring the final re-pulped mass to about 2% consistency. Such a rough slurry can readily be handled through a pump. The rough slurry is then circulated through a single disc refiner until it is completely re-pulped. To this thousand pounds of 2% consistency re-pulped cellulose fiber stock, which is also under agitation, there is added about twenty-five pounds of a pale, thermoplastic, neutral hydrocarbon resin. Such resins are readily available on the market. One is available under the trademark designation Betaprene H and sold by Reichhold Chemicals, Inc. Betaprene H is a very pale colored, thermoplastic, neutral hydrocarbon resin derived from a narrow range of monomeric olefins and diolefins. It has good wetting properties resulting in adhesion to a wide variety of surfaces.

Typical physical and chemical properties

| | |
|---|---|
| Melt point (B&R), C. degrees | 70 |
| Specific gravity | .93 |
| Pounds per gallon | 7.75 |
| Acid number, less than | 1 |
| Saponification number, less than | 1 |
| Iodine number (Wijs) | 84 |
| Bromine number | 10 |
| Flash point (COC), F. degrees | 450 |
| Fire point (COC), F. degrees | 475 |
| Average molecular weight | 800 |
| Color, Gardner Scale | 6½ |
| Color, Coal Tar Scale | ½–1 |
| Color, Rosin Scale | X |

Another suitable resin similar to the one above mentioned is sold under the trade name Piccopale 100 by Pennsylvania Industrial Chemical Corporation. The trade name Piccopale refers to the polymerization product obtained by catalytic reacting under carefully controlled conditions, a mixture of monomers having an average molecule weight approximating 90, and composed essentially of dienes and reactive olefines to produce a hard solid resin with a resulting average molecular weight approximating 1100 and generally approximating 100 degrees C. ball and ring softening point.

Piccopale appears to be methylated paraffin chains containing only a limited amount of unsaturation either of trans type II or terminal double bonds. The large number of tertiary hydrogens produce misleading results when the material is analyzed for unsaturation by the Wijs' iodine method unless a correction is made for substitution. An iodine value of 120 by the usual method when corrected for the presence of hydrogen halide from substitution gives a corrected iodine value of 23 which agrees in principle with a Koppeschaar bromination number of approximated 7. The ebullioscopic molecular weight of 1050, taken with the corrected iodine number, would indicate 1.9 double bonds per mol, or from the bromine number .9 double bond per mol.

A still further suitable resin in the same category as those mentioned above is sold under the trade name Velsicol XI–30 by the Velsicol Chemical Corporation. Velsicol XL–30 is a thermoplastic light color hydrocarbon resin derived from selected and refined petroleum stocks. The resin is a linear polymer, has a highly aromatic structure and is low in olefinic unsaturation.

Typical physical and chemical properties

| | |
|---|---|
| Form | Flaked |
| Softening point (ball and ring), degrees F. | 215–225 |
| Softening point (ball and ring), degrees C. | 102–107 |
| Color, Gardner (50% in toluene) | 6–8 |
| Saponification number | 0–2 |
| Acid number | 0–2 |
| Specific gravity at 60 degrees F. | 1.04–1.07 |
| Pounds per gallon at 60 degrees F. | 8.66–8.91 |
| Viscosity, G.H. at 60% in toluene | B |

The resin employed is first put in suspension with water. This is done by putting twenty-five pounds of the resin into five gallons of water and one pound of a suitable wetting agent although the usage of a wetting agent is optional. This mixture is introduced into a small ball mill and run about forty-five minutes. This makes a good suspension of the material and it will then readily mix with the 2% consistency re-pulped paper stock.

After the pulp slurry and resin have been thoroughly mixed together there is then added about twenty-five pounds of 50% solids parafin wax emulsion size and from sixty to eighty pounds of 35% solids phenol-formaldehyde resin. After this has been completely mixed in with the batch the pH of the batch is adjusted to between 4.5 and 5 with about two pounds of alum in order to obtain the precipitation of the wax and resins onto the cellulose fibers. The stock slurry is then ready for forming the overlay material on the cylinder machine.

Figure 2:
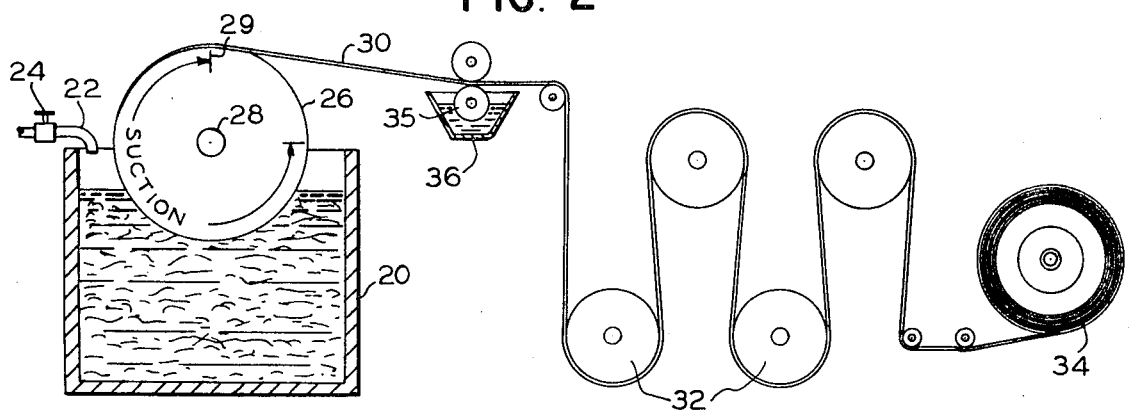
FIG. 2 is a schematic drawing illustrating the process and means for forming the webs.

Referring to FIG. 2, a typical web forming cylinder machine is schematically shown comprising a stock tank 20 to which slurry is pumped through an inlet pipe 22 at a rate of admission controllable by a suitable valve 24. A large diameter suction cylinder 26 dips into the slurry and draws fibers onto the screen surface thereof, the white water being ejected through the hollow hub 28 of the cylinder in the usual manner. The thickness of the deposit formed on the cylinder screen is regulated by the speed with which the cylinder is rotated and by the amount of suction applied through the hollow hub. The usual valve means of the cylinder machine (not shown) is utilized to cut off the suction at a certain point, such as at 29, so that the web may be stripped from the cylinder and led therefrom onto the drying rolls 32. The thickness of the web stripped from the cylinder is preferably 3/64 to 3/32 inch thick. The moisture content of the web 30 as it comes from the suction cylinder 26 is normally about 75% of the total weight of the web. As the web 30 passes over the drying rolls 32 the moisture content of the web upon emergence from the last roll is reduced to about 60% of the total weight of the web. The web is wound up as at 34 and it is then ready for use in laying up a sandwich prior to introduction of the same into the hot press. It has been found that by the addition of the pale, thermoplastic neutral hydrocarbon resin to the slurry as described, the resultant skins of the finished panels upon emergence of the panels from the hot press are smooth and slick and separate readily from the caul plates without any evidence of sticking and without any build-up of any resin or other residue upon the caul plates even though the latter have rough or uneven, pattern producing surfaces as discussed in my above mentioned application, Ser. No. 12,356.

If it is desired to have a color coating on the finished product the color material may be added by means of a color applicator arranged between the web forming screen and the drying rolls such as indicated by the tank 36 and the applicator roll 35, dipping into the liquid containing tank 36 and transferring liquid therefrom to the surface of the web 30 in the amount of 8 to 10 pounds per thousand square feet of web.

The color mixture preferably consists of approximately 65% water, 30% of a suitable basic polymer emulsion and about 5% pigment which may be a solid dry color powder. Precautions must be taken in the preparation of the color mixture so that it will not cause sticking of the web to the caul plates or to the platen if no caul plates are employed. One basic polymer emulsion which has been found to be very suitable is that which is sold under the trademark Wallpol 40-133 which is readily available in commercial quantities and sold by Reichhold Chemicals, Inc.

Specifications and properties—Wallpol 40-133

| | |
|---|---|
| Type | Vinyl-acrylic-latex. |
| Non-volatile | 54-56%. |
| Volatile | Water. |
| Viscosity (Brookfield) | 300-1300. |
| Color | Milky. |
| Specific gravity solution | 1.08. |
| Pounds/gallons solution | 9.0. |

Another material which may be used is available from the same company under the trademark Wallpol 40-310.

Specifications and properties—Wallpol 40-310

| | |
|---|---|
| Type | Vinyl acetate homopolymer. |
| Non-volatile | 54-56%. |
| Volatile | Water. |
| Viscosity (centipoises) | 1000-2000. |
| Specific gravity emulsion | 1.09. |
| Pounds/gallons emulsion | 9.1. |
| Pounds/gallons non-volatile (calculated) | 10.00. |
| pH | 4.0-6.0. |
| pH —Stability, range | 2.5-10.0. |
| Particle size, microns | .5-.10. |
| Borax Stability | Stable. |
| Emulsion type | Anionic. |

A still further material which has been found satisfactory is available under the trademark Synthemul 40-400 and sold by Reichhold Chemicals, Inc.

Specifications and properties—Synthemul 40-400

| | |
|---|---|
| Type | Acrylate ester copolymer. |
| Solds content, by weight | 46±0.5%. |
| Viscosity (spindle #3 @ 60 r.p.m., Brookfield LVF Viscometer | 1000±500 cps. |
| pH | 8.5-9.5. |
| Weight per gallon, latex | 8.8-9.0 lbs. |
| Weight per gallon, solids | 9.5-9.7 lbs. |
| Appearance | Milky white liquid. |
| Odor | Bland. |

All of the above mentioned products are herein classified as being basic polymer emulsions. The first mentioned or preferred emulsion is a vinyl-acrylic material and has a solids content of about 55%. This latter material is originally quite viscous and sticky but when reduced with water in the proportions indicated the resultant coating of the material on to the wet webs will not cause sticking to the caul plates or press platens.

The aqueous, pigmented, color coating mixture is applied to the surface of the wet web which is to face outwardly of the assembled sandwich so that the colored surface will be on the side of the panel which is to be exposed to the weather. By applying the aqeuous color coating to the web while it is still in the wet state it will lock into the soft, spongy surface thereof and during the hot pressing operation the color coating will be baked into the surface of the skin and will not flake or peel off upon weathering. Moreover, due to the presence of pale, thermoplastic, hydrocarbon resin no resin bleeding will occur through the color coating during the hot pressing operation sufficient to cause blotching or other undesirable discoloration of the color coating. Furthermore, the color coating prepared and applied to the web as indicated will not result in any sticking of the panel to the caul plate or platen surface or in any build up of residue upon the surface of the caul plate even though it has a rough or uneven pattern producing surface.

Figure 3:
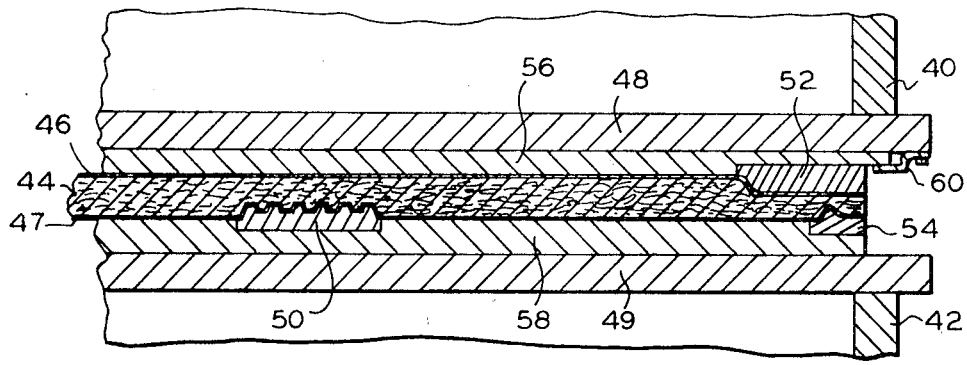
FIG. 3 is a fragmentary view in cross-section illustrating typical hot press parts used in manufacturing panels with surface skins produced from webs prepared in accordance with the present invention.

FIG. 3 is a view illustrating a typical method of manufacturing an embossed panel. A pair of hot press platens are shown in fragmentary cross section at 40 and 42. A board panel, made up as shown in fragmentary section in FIG. 1 is indicated at 44 having skins 46 and 47 on the opposite sides thereof, skin 47 being the outer surface of the finished panel. Since it is usually impractical to provide the embossing means directly on the facing platen plates 48, 49, the embossing inserts 50, 52 and 54 are shown secured in the facing surfaces of the caul plates 56 and 58. The upper caul plate 56 is shown removably attached to the upper platen by chips 60. Since the embossing element 52 is, in this instance, a simple strip, the element 52 may be attached directly to the edge of the upper platen 48 and the upper caul plate 56 with attaching clip 60 eliminated.

With the webs for the skins 46 and 47 prepared in accordance with the present invention, no sticking will occur between the finished panel 44, 46, 47 and the caul plates but will separate freely therefrom. No resin or other residue build up on the surface of the embossing caul plates, or platens, in the event one or both caul plates are omitted and instead such surfaces will remain clean eliminating periodic cleaning operations thereof.

What I claim is:

1. A process for making a web for use in forming a cover layer for a composite panel,
   (a) said process comprising forming a slurry of cellulosic pulp and other ingredients in approximately the following ratios and manner,
   (b) first, adding to one thousand pounds of approximately two percent consistency of cellulosic fiber pulp stock in water about twenty-five pounds of a pale, thermoplastic neutral hydrocarbon resin, said resin first having been thoroughly placed in suspension in about five gallons of water and then thoroughly mixing the same,
   (c) then adding about twenty-five pounds of 50% solids paraffin wax emulsion size, and sixty to eighty pounds of 35% solids phenol-formaldehyde resin,
   (d) after thoroughly mixing the batch, adjusting the pH thereof to between 4.5 and 5 with about two pounds alum to precipitate the wax and resin onto the pulp fibers,
   (e) then vacuum forming a web from said slurry.

2. The process according to claim 1 which further includes reducing the moisture content of said web to approximately 75% total weight water and applying to the outer surface on one side of said web a coating of a color mixture consisting of about 65% of water, 30% of basic polymer emulsion from the group consisting of vinyl acrylic latex, vinyl acetate homopolymer, and acrylate ester copolymer and about 5% pigment, then further drying the coated web to bring the total moisture weight to about 60% by weight.

3. The process according to claim 2 in which the color coating material is applied to the web in the amount of 8 to 10 pounds per thousand square feet of web.

4. The process according to claim 2 in which the basic polymer emulsion is a vinyl acrylic material.

References Cited
UNITED STATES PATENTS

| 3,308,013 | 3/1967 | Bryant | 162—165 |
| 3,379,663 | 4/1968 | Takei | 162—168 |

S. LEON BASHORE, Primary Examiner

P. CHIN, Assistant Examiner

U.S. Cl. X.R.

162—168, 172, 184

UNITED STATES PATENT OFFICE
CERTIFICATE OF CORRECTION

Patent No. 3,748,222    Dated July 24, 1973

Inventor(s)  Robert G. Wheeler

It is certified that error appears in the above-identified patent and that said Letters Patent are hereby corrected as shown below:

Column 4, line 11, "approximated" should read -- approximately --; line 17, "XI-30" should read -- XL-30 --. Column 5, line 64, "solds" should read -- solids --. Column 6, line 37, "chips" should read -- clips --.

Signed and sealed this 8th day of January 1974.

(SEAL)
Attest:

EDWARD M. FLETCHER, JR.        RENE D. TEGTMEYER
Attesting Officer              Acting Commissioner of Patents